(12) United States Patent
Tool

(10) Patent No.: US 7,690,320 B1
(45) Date of Patent: Apr. 6, 2010

(54) ENCLOSURE DEVICE FOR A MARINE DRIVE UNIT

(76) Inventor: Christopher Scott Tool, 2670 Independence Cir., Corona, CA (US) 92882

( * ) Notice: Subject to any disclaimer, the term of this patent is extended or adjusted under 35 U.S.C. 154(b) by 2 days.

(21) Appl. No.: 12/239,933

(22) Filed: Sep. 29, 2008

(51) Int. Cl.
*B60P 3/10* (2006.01)

(52) U.S. Cl. .................................. 114/344; 280/414.1

(58) Field of Classification Search ................. 114/344; 280/414.1, 414.2; 296/186.4; 414/495; 440/72
See application file for complete search history.

(56) References Cited

U.S. PATENT DOCUMENTS

| | | | |
|---|---|---|---|
| 3,717,268 A | 2/1973 | Snodgrass | |
| 3,870,875 A | 3/1975 | Altimus | |
| 4,842,239 A | 6/1989 | Kinsey et al. | |
| 5,004,260 A * | 4/1991 | Smyly, Sr. | 280/414.1 |
| 5,058,946 A * | 10/1991 | Faber | 280/414.1 |
| 5,660,136 A | 8/1997 | Pignatelli et al. | |
| 5,759,075 A | 6/1998 | Steep et al. | |
| 5,791,955 A | 8/1998 | Rinck | |
| 6,152,064 A | 11/2000 | Morton | |
| 6,217,200 B1 | 4/2001 | Huffman | |
| 6,736,686 B2 | 5/2004 | Miller | |

* cited by examiner

*Primary Examiner*—Lars A Olson
(74) *Attorney, Agent, or Firm*—Eric Karich

(57) ABSTRACT

An enclosure device has a protective cage shaped to fit around a marine drive unit of a boat, and trailer mounting elements adapted to be mounted on a trailer carrying the boat. Pivotal elements pivotally mount the protective cage on the trailer mounting elements so that the protective cage pivots between a lowered position wherein the protective cage is beneath the marine drive unit and does not interfere with offloading the boat from the trailer, and a raised position wherein the protective cage at least partially encloses the marine drive unit. A locking element may be used to lock the protective cage in the raised position.

17 Claims, 5 Drawing Sheets

ENCLOSURE DEVICE FOR A MARINE DRIVE UNIT

BACKGROUND OF THE INVENTION

1. Field of the Invention

This invention relates generally to enclosure devices, and more particularly to an enclosure device for enclosing and protecting a marine drive unit of a boat or similar vessel.

2. Description of Related Art

There are various prior art propeller protective assemblies that are adapted to be mounted directly on a motor to protect the propeller. Examples of such constructions include the following:

Miller, U.S. Pat. No. 6,736,686, teaches a boat propeller safety enclosure for the covering of the propeller of a boat during road transportation. The enclosure has a cinchable opening for ease of attachment and removal and for tightly fitting about a propeller. A reflective and/or brightly colored surface is provided.

Huffman, U.S. Pat. No. 6,217,200, teaches a safety light apparatus designed to be detachably mountable on a hub of the propellered motor. The apparatus preferably comprises a housing with a mounting recess, which is adapted to receive the hub, formed in a rear side thereof and a light assembly disposed on a front side of the housing.

Morton, U.S. Pat. No. 6,152,064, teaches a protective propeller cover that includes a flexible sleeve into which buoyant material is placed to provide a buoyant enclosure, and a distal end that is releasably secured about the propeller. The buoyant enclosure is positioned adjacent to the propeller and is sized to extend above the water line when the propeller is positioned beneath the water line. The buoyant enclosure serves to protect swimmers from direct contact with the propeller when swimming in proximity to the boat.

Other similar structures are disclosed in Rinck, U.S. Pat. No. 5,791,955; Steep et al., U.S. Pat. No. 5,759,075; Pignatelli et al., U.S. Pat. No. 5,660,136; Currey, U.S. Pat. No. 5,021,016; Kinsey et al., U.S. Pat. No. 4,842,239; Altimus, U.S. Pat. No. 3,870,875; Driscoll, U.S. Pat. No. 3,693,576; and Martt, U.S. Pat. No. 2,795,432.

Other devices that are attached to a boat trailer are adapted for other purposes. Snodgrass, U.S. Pat. No. 3,717,268, for example, teaches a boat trailer that includes a rear end protrusion end members that extend from the rear of the trailer to form a V-shaped recess for guiding and centering a boat being loaded onto the trailer. Whipple, U.S. Pat. No. 5,980,073, teaches a boat trailer lighting system that includes an electrical light assembly having an electric lamp rotatably attached to a skeg mounting bracket which is removably attached to an outboard motor skeg.

The above-described references are hereby incorporated by reference in full.

The prior art teaches propeller protective devices that are mounted on the propeller or motor. However, the prior art does not teach an enclosure device mountable upon a trailer for enclosing a marine drive unit of a boat when the boat is on the trailer. The present invention fulfills these needs and provides further related advantages as described in the following summary.

SUMMARY OF THE INVENTION

The present invention teaches certain benefits in construction and use which give rise to the objectives described below.

The present invention provides an enclosure device mountable upon a trailer for enclosing a marine drive unit of a boat when the boat is on the trailer. The enclosure device comprises a protective cage shaped to fit around the marine drive unit; and a mounting system for mounting the protective cage on the trailer such that the protective cage pivots between a lowered position wherein the protective cage is beneath the marine drive unit and does not interfere with offloading the boat from the trailer, and a raised position wherein the protective cage at least partially encloses the marine drive unit.

A primary objective of the present invention is to provide an enclosure device having advantages not taught by the prior art.

Another objective is to provide an enclosure device that protects people walking adjacent a marine drive unit of a boat from being injured by the propeller or other portion of the marine drive unit.

A further objective is to provide an enclosure device that protects the marine drive unit from damage and/or theft.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
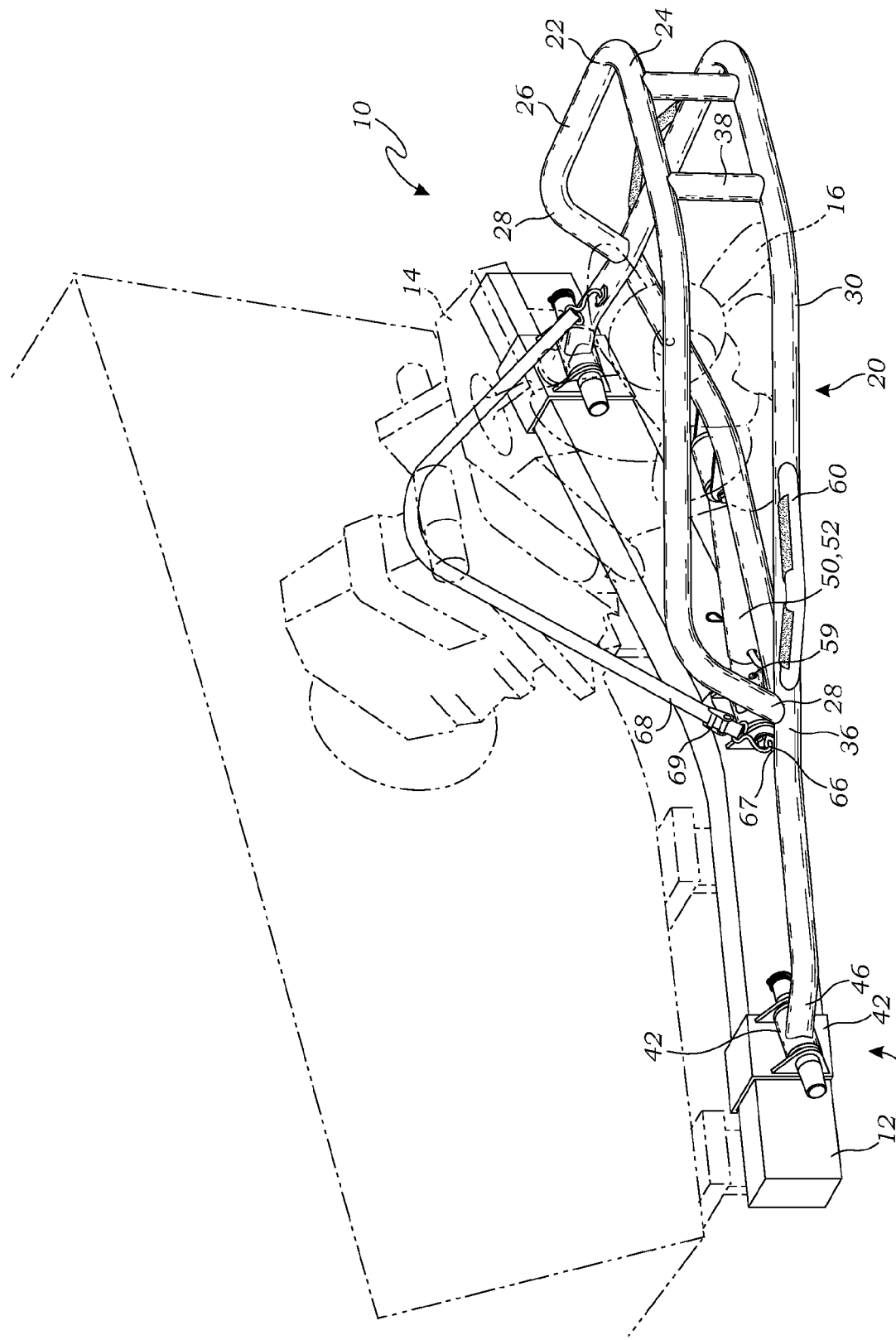
FIG. 1 is a perspective view of one embodiment of the enclosure device, illustrating the enclosure device in a raised position.

The above-described drawing figures illustrate the invention, an enclosure device 10 mountable upon a trailer 12 for enclosing a marine drive unit 14 of a boat 18 when the boat 18 is on the trailer 12. The enclosure device 10 functions to protect people walking adjacent the marine drive unit 14 of the boat 18 from being injured by a propeller 16 or other portion of the marine drive unit 14. The enclosure device 10 also protects the marine drive unit 14 from damage and/or theft.

Figure 2:
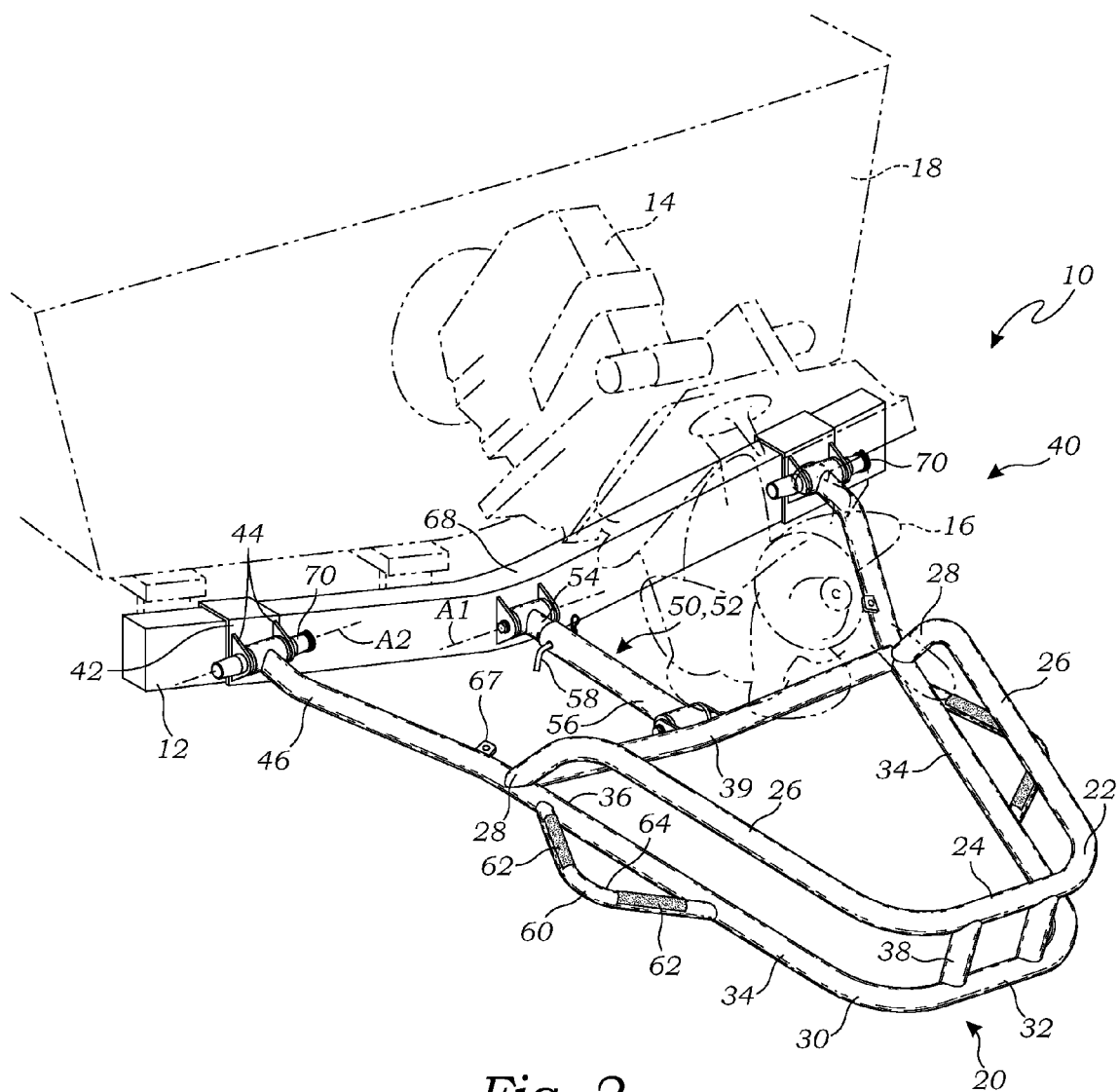
FIG. 2 is a perspective view of the enclosure device in a lowered position.
Figures 3, 4:
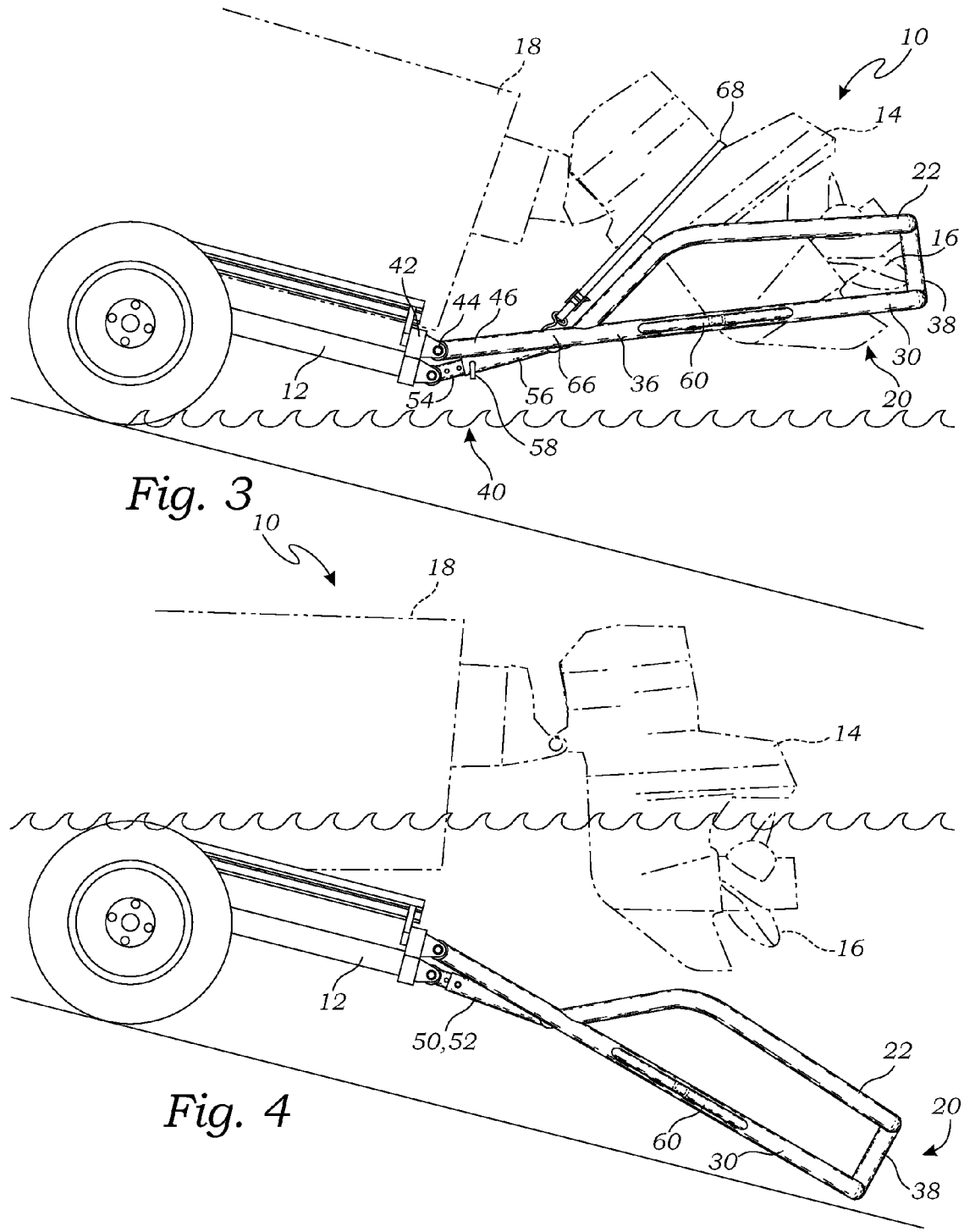
FIG. 3 is a side elevation view of the enclosure device of FIG. 1, illustrating the enclosure device in the raised position.
FIG. 4 is a side elevation view of the enclosure device of FIG. 2, illustrating the enclosure device in the lowered position.

FIG. 1 is a perspective view of one embodiment of the enclosure device 10, illustrating the enclosure device 10 in a raised position. FIG. 2 is a perspective view of the enclosure device 10 in a lowered position. FIGS. 3 and 4 are side elevation views of the enclosure device 10 mounted on a trailer 12 to illustrate movement of the enclosure device 10 from the raised position (FIG. 3) to the lowered position (FIG. 4).

As shown in FIGS. 1-4, the enclosure device 10 includes a protective cage 20 shaped to fit around the marine drive unit 14. For purposes of this application, the term "marine drive unit" (reference number 14) is hereby defined to include any form of motor, outdrive, outboard motor, propeller 16, jet drive, and/or any other form of marine propulsion system and/or any component thereof. The protective cage 20 is shaped to fit around the marine drive unit 14, and particularly around any propeller 16 or any other portion of the marine drive unit 14 that may pose a risk of injury to nearby persons. The protective cage 20 also physically prevents theft of the marine drive unit 14 or any components thereof (such as the propeller 16) while the protective cage 20 is in the raised position.

The protective cage 20 of the present embodiment may include a top U-shaped tubular element 22 and a bottom U-shaped tubular element 30. The top U-shaped tubular element 22 has a curved central portion 24 and top arms 26 extending to ends 28. The bottom U-shaped tubular element 30 has a curved central portion 32 and bottom arms 34 that extend to middle arm portions 36. Each of the ends 28 of the top U-shaped tubular element 22 may be welded to one of the middle arm portions 36 of the bottom U-shaped tubular element 30, such that the top and bottom U-shaped tubular elements 30 are generally parallel.

The protective cage 20 may further include vertical connector bars 38 connecting the top and bottom U-shaped tubular elements 22 and 30. The vertical connector bars 38 may be welded to the top and bottom U-shaped tubular element 22 and 30, and function to strengthen the construction of the protective cage 20. The protective cage 20 may further include additional features, such as a taillight and/or break light (not shown), and/or reflective elements (not shown), to make the protective cage 20 more visible in low light conditions. Such features not only help prevent accidents while the trailer 12 is being towed on the road, they also help prevent people from being accidentally injured when walking near the protective cage 20.

The protective cage 20 may also include various decorative features, such as panels (not shown) between the top and bottom U-shaped tubular elements 22 and 30, which can be painted and/or otherwise decorated to customize the protective cage 20 and otherwise make the enclosure device 10 more ascetically pleasing.

The protective cage 20 may further include a lateral support bar 39 that is welded to the middle arm portions 36 of the bottom U-shaped tubular element 30. The lateral support bar 39 provides lateral strength and rigidity to the protective cage 20. The lateral support bar 39 also provides a good point to locking the protective cage 20 in the raised position, as described in greater detail below.

For purposes of this application, the term "welded" is hereby defines to include any form of welding, bolting, or equivalent means of fastening together the described elements. The term "tubular" is hereby defined to include any form of tube, rod, or equivalent structure that is suitable for forming the element as described herein.

The term "protective cage" may include a relatively complex structure, as described herein, and it may also include alternative structures that are functional to protect the marine drive unit, and/or prevent theft of the marine drive unit. The protective cage may be as simple as a bar that fits closely around the propeller, a wire mesh or grating that more fully encloses the propeller, and/or any other structure that functions as described herein.

The enclosure device 10 further includes a mounting system 40 for mounting the protective cage 20 on the trailer 12. In the embodiment of FIGS. 1-4, the mounting system 40 includes trailer mounting elements 42 adapted to be mounted on the trailer 12 for mounting the protective cage 20 on the trailer 12. The trailer mounting elements 42 may be welded or otherwise joined with the trailer 12, or may be integrally formed as part of the trailer 12. In other embodiments, the trailer mounting elements 42 may also be removably attached to the trailer 12 so that they may be removed if desired.

In one embodiment, the trailer mounting elements 42 are trailer mounting brackets that are shaped to form a hinged connection with the pivotal elements 46 (such as the pivot arms 46 of the present embodiment). The trailer mounting brackets 42 may include outwardly extending flanges 44, for example, through which a mounting pin, bolt, or other element may be placed. In the preferred embodiment, a security locking mechanism 70 is positioned through the flanges, as described in greater detail below. The trailer mounting brackets 42 may be bolted to the trailer 12, welded, integrally formed with the trailer 12; and furthermore, the trailer mounting brackets 42 may include many structural features that may be used to form a hinged attachment with the protective cage 20, and such alternatives should be considered within the scope of the present invention. Those skilled in the art may devise many alternative hinged structures and/or arrangements, such alternatives should be considered within the scope of the present invention.

The protective cage 20 includes pivotal elements 46 that pivotally mount the protective cage 20 on the trailer mounting elements 42 adjacent the marine drive unit 14. The pivotal elements 46 pivotally mount the protective cage 20 so that it can pivot between a lowered position wherein the protective cage 20 is beneath the marine drive unit 14 and does not interfere with offloading the boat 18 from the trailer 12, and a raised position wherein the protective cage 20 at least partially encloses the marine drive unit 14.

As illustrated in FIGS. 1-4, the pivotal elements 46 may be pivot arms 46 that extend from the protective cage 20 for mounting on the trailer mounting elements 42 (such as the trailer mounting brackets 42 described above). The pivot arms 46 each may include a hinge element 48 that is adapted to pivotally mount on one of the trailer mounting elements 42. The hinge element 48 may be, for example, a lateral cylinder 48 shaped to receive the security locking mechanism 70. The security locking mechanism 70 fits through the flanges, described above, and the lateral cylinder 48, to form the hinge connection.

The pivot arms 46 may extend from the middle arm portions 36 of the bottom U-shaped tubular element 30, and the pivot arms 46 may be integrally formed with the bottom U-shaped tubular element 30. However, this is not required, and the bottom U-shaped tubular element 30 and the pivot arms 46 may be separate components. Furthermore, the pivot arms 46 may be connected to other portions of the protective cage 20.

Also illustrated in FIGS. 1-4, the enclosure device 10 also includes a locking element 50 for locking the protective cage 20 in the raised position. Those skilled in the art may devise many alternative structures, bars, straps, locking bolts or pins, and/or any other structure or feature that enables the user to lock the protective cage 20 in the raised position, and such alternative and/or equivalent structures should be considered within the scope of the present invention.

In one embodiment, the locking element 50 includes a locking bar 52 that is pivotally attached between the trailer 12 and the protective cage 20. The locking bar 52 may have a first bar element 54 and a second bar element 56 that telescopically engage each other. The first bar element 54 is adapted to be pivotally attached to the trailer 12, and the second bar element 56 telescopically engages the first bar element 54. The second bar element 56 is attached to or otherwise engages the lateral support bar 39 of the protective cage 20. In operation, sliding the second bar element 56 with respect to the first bar element 54 moves the protective cage 20 between the lowered and raised positions. A locking pin 58 is shaped to engage apertures 59 through the first and second bar elements 56 to lock the protective cage 20 in either the lowered position or the raised position.

To function properly, the locking bar 52 should pivot on an axis A1 that is slightly offset from the axis A2 of each of the pivotal elements 46, so that telescopically extending the locking bar 52 raises or lowers the protective cage 20.

The enclosure device 10 may further include a step element 60 extending laterally from the side of the protective cage 20 between the curved central portion 32 of the bottom U-shaped tubular element 30 and the pivotal element. The step element 60 may include grip tape 62 bonded to a top surface 64 of the step element 60 to prevent slipping on the step element 60. The step element 60 is useful for enabling a user to climb into the boat 18 when the boat 18 is on the trailer 12.

In one embodiment, the enclosure device 10 may further comprise a pair of hook elements 66 connected by a strap 68. The strap 68 may include a locking clip 69 for adjusting the length of the strap 68. The strap 68 is useful for further securing and stabilizing the protective cage 20. When one of the hook elements 66 is attached to the protective cage 20, the strap 68 can extend over the marine drive unit 14 and the other hook element 66 may be attached to the protective cage 20, such that the strap 68 thereby stabilizes the protective cage 20 against the marine drive unit 14. The locking clip 69 may be used to tighten the strap 68 to lock the pair of hook elements 66 on the protective cage 20, and lock the protective cage 20 securely against the marine drive unit 14.

Figure 5:
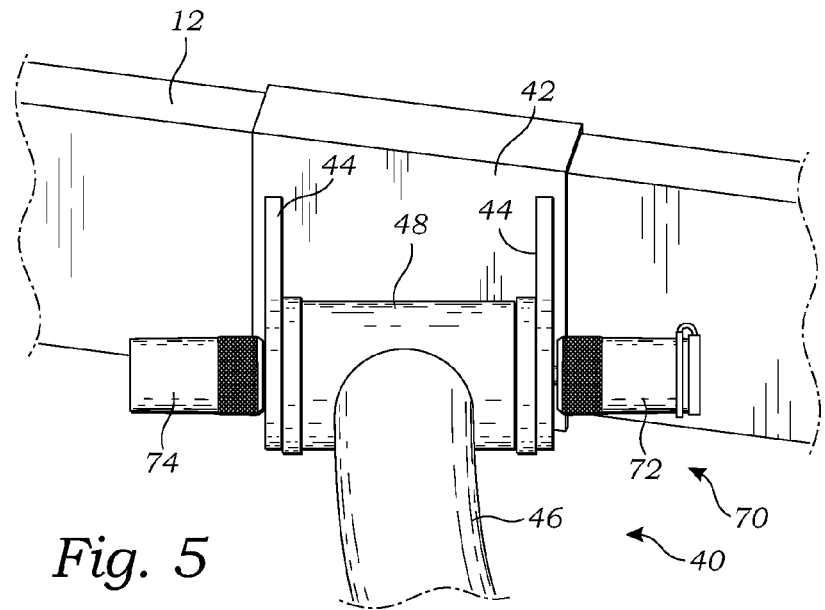
FIG. 5 is a perspective view of a security locking mechanism.
Figure 6:
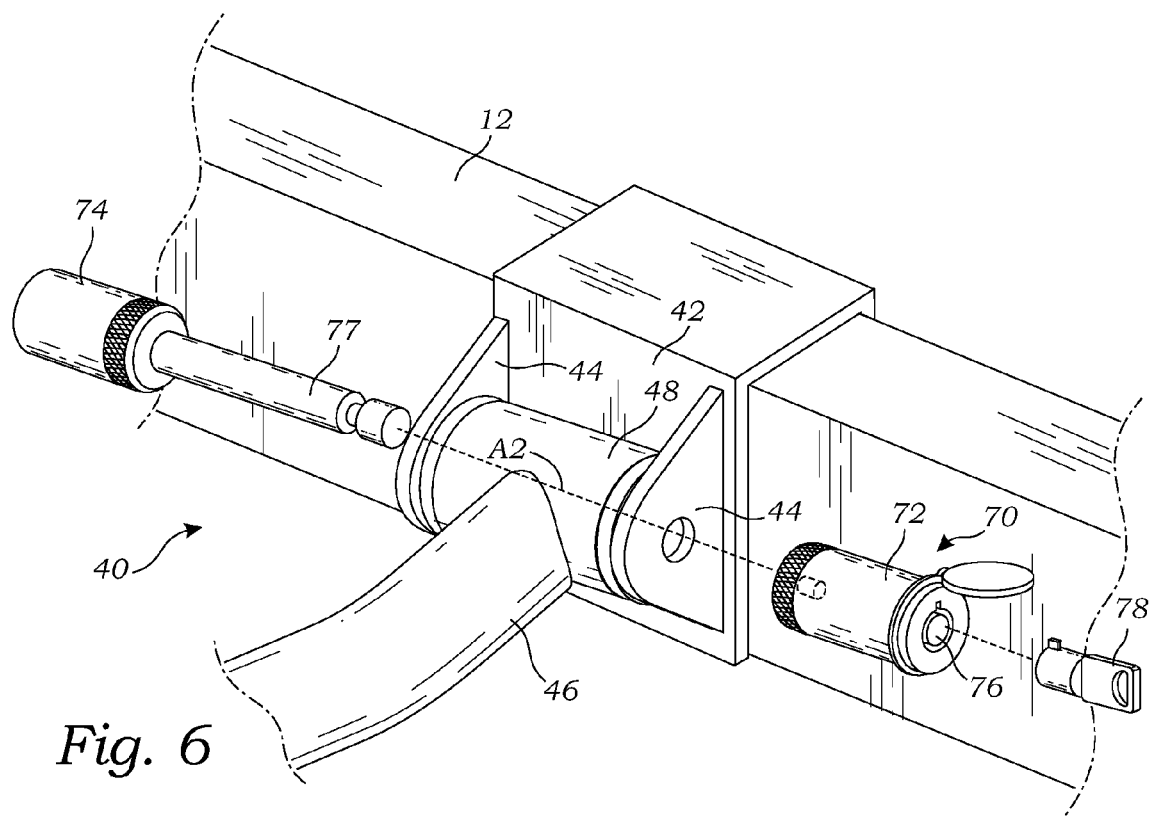
FIG. 6 is an exploded perspective view of the security locking mechanism.

FIG. 5 is a perspective view of the security locking mechanism 70 that may be used for removably locking the pivotal elements 46 to the trailer mounting elements 42 or otherwise couple the pivotal element 46 with the trailer mounting element 42, as described above. FIG. 6 is an exploded perspective view thereof. As illustrated in FIGS. 5 and 6, in one embodiment, each of the security locking mechanisms 70 includes a first component 72 and a second component 74 that may be removably locked together with a lock 76 to form a pivot structure 77 about which the pivotal element 46 and the trailer mounting element 42 can pivot.

The lock 76 of the security locking mechanism 70 prevents the first and second components 74 from being separated unless a key (not shown) or equivalent mechanism, such as a combination lock, are used to unlock the two elements. In this manner, the pivotal element 46 is locked to the trailer mounting element 42 until unlocked, thereby preventing theft of the enclosure device 10 and/or the marine drive unit 14 and/or components thereof.

In other embodiments, however, another structure that enables the pivotal mounting of the protective cage 20 on the trailer 12 may be used, and such alternative constructions should be considered within the scope of the present invention.

Figure 7:
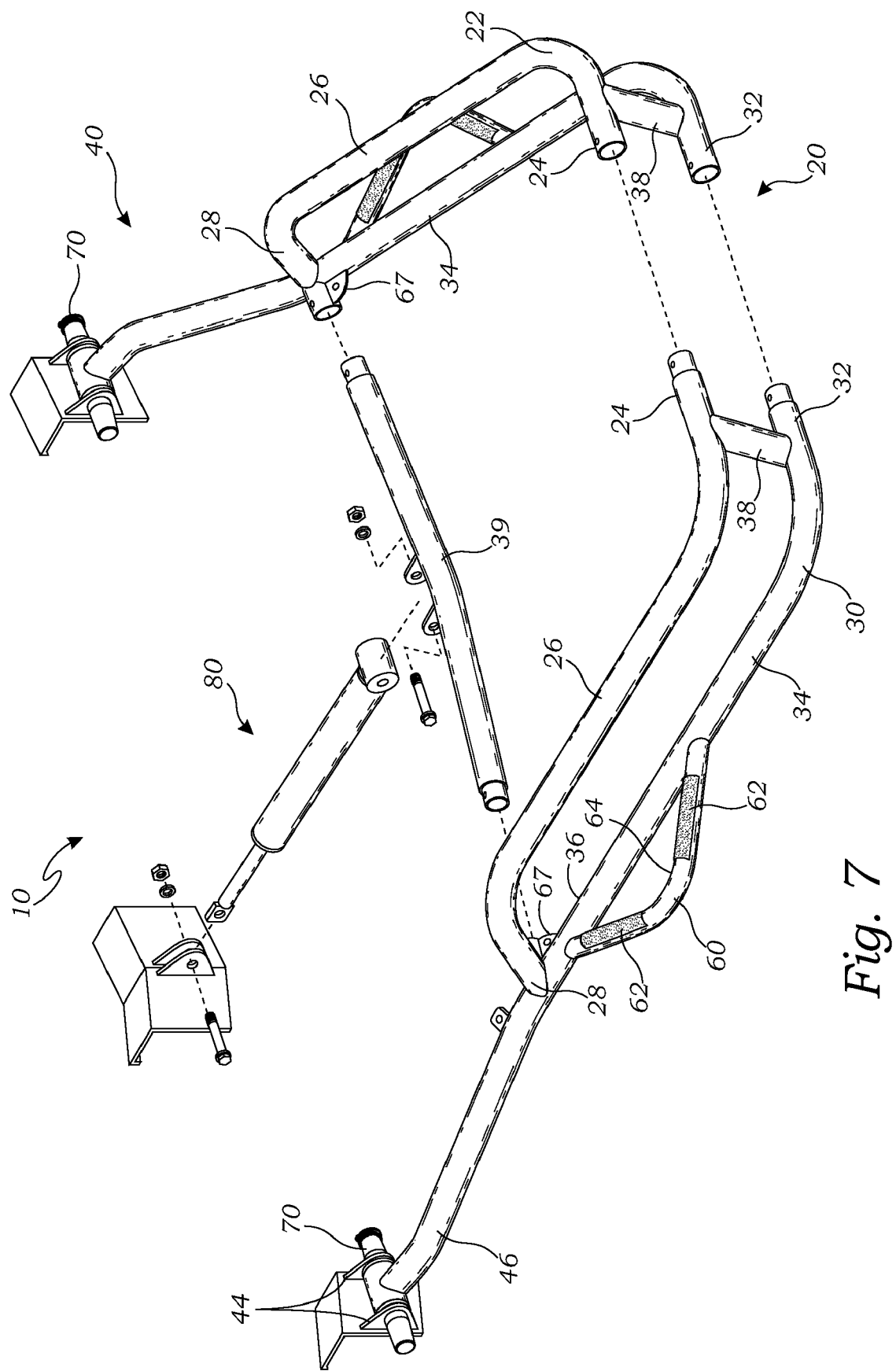
FIG. 7 is an exploded perspective view of another embodiment of the enclosure device.

FIG. 7 is an exploded perspective view of another embodiment of the enclosure device 10. In the embodiment of FIG. 7, the protective cage 20 of the enclosure device 10 is constructed of multiple components that are adapted to be fastened together with fasteners so that the protective cage 20 may be more easily stored and shipped. The protective cage 20 is adapted to be easily assembled by the user once it has been shipped to the location of the trailer 12. While one such embodiment is illustrated by those skilled in the art, it will be appreciated that alternative embodiments with different structures and methods of assembly may be devised by those skilled in the art, and such alternatives should be considered within the scope of the present invention.

In the embodiment of FIG. 7, the locking element may be a hydraulic cylinder 80. Hydraulic lines (not shown) operably connected to a control unit (not shown) enable the automatic raising and lowering of the protective cage 20. For purposes of this application, the term "hydraulic cylinder" is defined to include any form of hydraulic, pneumatic, or related actuator that functions to raise and lower the protective cage 20 as described herein. Since the construction and function of a hydraulic cylinder are well known in the art, they are not described in greater detail herein. Alternative embodiments may include an electric motor, or any other similar device known in the art for raising and lowering the protective cage 20.

It will also be understood by those skilled in the art that all of the structures illustrated in FIGS. 1-7, and claimed below, may vary a great deal based upon the shape and size of the boat, the size, shape, and type of marine drive unit, and other considerations, and such alternatives, and equivalent structures, should be considered within the scope of the present invention.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one embodiment, it is to be clearly understood by those skilled in the art that the invention is not limited thereto. Rather, the scope of the invention is to be interpreted only in conjunction with the appended claims.

What is claimed is:

1. An enclosure device mountable upon a trailer for enclosing a marine drive unit of a boat when the boat is on the trailer, the enclosure device comprising:

a protective cage shaped to fit around the marine drive unit;

trailer mounting elements adapted to be mounted on the trailer;

pivotal elements that pivotally mount the protective cage on the trailer mounting elements adjacent the marine drive unit so that the protective cage pivots between a lowered position wherein the protective cage is beneath the marine drive unit and does not interfere with offloading the boat from the trailer, and a raised position wherein the protective cage at least partially encloses the marine drive unit; and a locking element for locking the protective cage in the raised position.

2. The enclosure device of claim 1, further comprising security locking mechanisms for removably locking the pivotal elements to the trailer mounting elements.

3. The enclosure device of claim 2, wherein each of the security locking mechanisms includes a first component and a second component that may be removably locked together with a lock to form a pivot pin that forms a pivot between the pivotal element and the trailer mounting element.

4. The enclosure device of claim 1, wherein the protective cage includes a top U-shaped tubular element and a bottom U-shaped tubular element, the top U-shaped tubular element having a curved central portion and top arms extending to ends, the bottom U-shaped tubular element having a curved central portion and bottom arms that extend to middle arm portions, each of the ends of the top U-shaped tubular element being welded to one of the middle arm portions of the bottom U-shaped tubular element.

5. The enclosure device of claim 4, wherein the protective cage further includes a lateral support bar that is welded to the middle arm portions of the bottom U-shaped tubular element.

6. The enclosure device of claim 5, wherein the pivotal elements are pivot arms that extend to hinge elements adapted to be pivotally mounted on the trailer mounting elements, the pivot arms extending from the middle arm portions of the bottom U-shaped tubular element.

7. The enclosure device of claim 5, wherein the locking element comprises:
   a locking bar having a first bar element and a second bar element, the first bar element being adapted to be pivotally attached to the trailer, the second bar element telescopically engaging the first bar element and extending to engage the lateral support bar of the protective cage, such that sliding the second bar element with respect to the first bar element moves the protective cage between the lowered and raised positions; and
   a locking pin shaped to engage apertures through the first and second bar elements to lock the protective cage in either the lowered position or the raised position.

8. The enclosure device of claim 4, further comprising vertical connector bars connecting the top and bottom U-shaped tubular element.

9. The enclosure device of claim 4, further comprising a step element extending laterally from the side of the protective cage between the curved central portion of the bottom U-shaped tubular element and the pivotal element, the step element having grip tape bonded to a top surface of the step element.

10. The enclosure device of claim 1, further comprising a pair of hook elements connected by a strap, such that when one of the hook elements is attached to the protective cage the strap can extend over the marine drive unit and the other hook element may be attached to the protective cage, and such that the strap thereby stabilizes the protective cage against the marine drive unit.

11. An enclosure device mountable upon a trailer for enclosing a marine drive unit of a boat when the boat is on the trailer, the enclosure device comprising:
   a protective cage shaped to fit around the marine drive unit;
   trailer mounting brackets adapted to be mounted on the trailer;
   pivot arms that pivotally mount the protective cage on the trailer mounting brackets adjacent the marine drive unit so that the protective cage pivots between a lowered position wherein the protective cage is beneath the marine drive unit and does not interfere with offloading the boat from the trailer, and a raised position wherein the protective cage at least partially encloses the marine drive unit;
   a locking bar having a first bar element and a second bar element, the first bar element being adapted to be pivotally attached to the trailer, the second bar element telescopically engaging the first bar element and extending to engage the protective cage, such that sliding the second bar element with respect to the first bar element moves the protective cage between the lowered and raised positions; and
   a locking pin shaped to engage apertures through the first and second bar elements to lock the protective cage in either the lowered position or the raised position.

12. The enclosure device of claim 11, wherein the trailer mounting brackets are removably mountable upon the trailer.

13. The enclosure device of claim 11, further comprising security locking mechanisms for removably locking the pivotal elements to the trailer mounting elements.

14. The enclosure device of claim 13, wherein each of the security locking mechanisms includes a first component and a second component that may be removably locked together with a lock to form a pivot pin that forms a pivot between the pivotal element and the trailer mounting element.

15. The enclosure device of claim 11, wherein the protective cage includes a top U-shaped tubular element and a bottom U-shaped tubular element, the top U-shaped tubular element having a curved central portion and top arms extending to ends, the bottom U-shaped tubular element having a curved central portion and bottom arms that extend to middle arm portions, each of the ends of the top U-shaped tubular element being welded to one of the middle arm portions of the bottom U-shaped tubular element.

16. The enclosure device of claim 15, wherein the protective cage further includes a lateral support bar that is welded to the middle arm portions of the bottom U-shaped tubular element.

17. An enclosure device mountable upon a trailer for enclosing a marine drive unit of a boat when the boat is on the trailer, the enclosure device comprising:
   a protective cage shaped to fit around the marine drive unit; and
   a mounting system for mounting the protective cage on the trailer such that the protective cage pivots between a lowered position wherein the protective cage is beneath the marine drive unit and does not interfere with offloading the boat from the trailer, and a raised position wherein the protective cage at least partially encloses the marine drive unit.

* * * * *